United States Patent [19]

Lee

[11] Patent Number: 4,875,714
[45] Date of Patent: * Oct. 24, 1989

[54] PLASTIC PIPE WITH LOCKING INTEGRAL END CONNECTION

[75] Inventor: Leonard E. Lee, St. Louis, Mo.

[73] Assignee: Mid-Continent Pipe & Supply Company, Inc., Fenton, Mo.

[ * ] Notice: The portion of the term of this patent subsequent to Oct. 25, 2005 has been disclaimed.

[21] Appl. No.: 250,390

[22] Filed: Sep. 28, 1988

Related U.S. Application Data

[63] Continuation-in-part of Ser. No. 69,895, Jul. 6, 1987, Pat. No. 4,779,902.

[51] Int. Cl.⁴ ............................................. F16L 47/00
[52] U.S. Cl. ....................................... 285/86; 285/260; 285/423; 285/921
[58] Field of Search ................. 285/260, 921, 903, 86, 285/423

[56] References Cited

U.S. PATENT DOCUMENTS

| | | | |
|---|---|---|---|
| 1,474,375 | 11/1923 | Moore | 285/355 X |
| 2,366,067 | 12/1944 | Smith . | |
| 2,772,102 | 11/1956 | Webb | 285/334 |
| 2,885,225 | 5/1959 | Rollins | 285/334 X |
| 2,889,089 | 6/1959 | Herrick et al. | 285/260 X |
| 2,985,469 | 5/1961 | Bowman, Jr. . | |
| 3,047,025 | 7/1962 | Davis | 285/260 X |
| 3,217,400 | 11/1965 | Illesy et al. | 285/260 X |
| 3,666,297 | 5/1972 | Marks . | |
| 3,784,235 | 1/1974 | Kessler et al. . | |
| 3,989,284 | 11/1976 | Blose | 285/334 X |
| 4,030,850 | 6/1977 | Hyde | 285/921 X |
| 4,128,264 | 12/1978 | Oldford | 285/319 X |
| 4,298,221 | 11/1981 | McGugan . | |
| 4,392,294 | 7/1983 | Campbell . | |
| 4,600,225 | 7/1986 | Blose | 285/334 |
| 4,601,491 | 7/1986 | Bell, Jr. et al. . | |
| 4,629,221 | 12/1986 | Lumsden et al. . | |
| 4,747,621 | 5/1988 | Gans et al. | 285/921 X |
| 4,779,902 | 10/1988 | Lee | 285/260 |
| 4,790,571 | 12/1988 | Montanari et al. | 285/86 |

FOREIGN PATENT DOCUMENTS 2107814  5/1983  United Kingdom ............... 285/260

Primary Examiner—Thomas F. Callaghan
Attorney, Agent, or Firm—Robbins & Robbins

[57] ABSTRACT

Plastic, such as polyolefin, pipe having a locking integral end connection. The pipe is fabricated with male and female end connections in order that the pipe may be press-fitted together with the interior and exterior forming a flush uninterrupted surface. One or more radial ribs and grooves are formed on the interior of the female connection while a registering series of ribs and grooves are formed on the exterior of the male connection. The ribs and grooves are of an interfitting axially extending wedge shaped configuration to provide a locking engagement to resist any tendency for separation. Interfitting corners of the ribs and grooves may be rounded to distribute stress and minimize damage when the pipe ends are fitted together. The ends of the pipe are bevelled in order that the ends pressed together engage and by the slight resiliency of the polyolefin pipe construction permit the slight expansion and contraction of the ends to provide a locking interfit of the respective ribs and grooves in the two ends. A reinforcing sleeve may be used over the coupling for additional strength. The wall thicknesses of the end connection and width of the ribs and grooves are particularly dimensioned in order that the male end may be inserted to a complete lock position without premature engagement.

24 Claims, 2 Drawing Sheets

PLASTIC PIPE WITH LOCKING INTEGRAL END CONNECTION

RELATED APPLICATION

This application is a continuation-in-part of my copending application, Ser. No. 069,895, filed July 6, 1987 and now U.S. Pat. No. 4,779,902.

BACKGROUND OF THE INVENTION

With the advent of plastic pipe such as polyolefin and other plastic materials, there has existed a need for connecting lengths of pipe together to form a string of pipes. The use of such plastic pipe has ranged from an inch or so in diameter to as much as five feet.

The connecting together of such pipes has presented a problem which is of particular significance in the field where access to equipment and labor may be difficult. While fusion of the pipe ends has been done for some time, this has generally been somewhat laborious and expensive.

Various types of end connections have been devised requiring clamps and auxiliary paraphernalia. One such device using clamping is shown in the exterior pipe connector sleeve of U.S. Pat. No. 4,310,184 in which the pipe ends are butted together and clamped by the sleeve. This device and other end clamps require extraneous parts with the danger of the protruding clamp being accidentally struck and damaged by external forces. For example, when joined strings of pipe are pulled in a slip-lining construction job, it is particularly desirable that the exterior of the pipe be completely flush to enhance the pulling or pushing of the pipe along the ground or through a large pipe to be repaired.

Further problems have been a tendency for connected ends to pull apart while in service with consequent damage to the pipe line and environment and difficulty in location of the break and repair.

SUMMARY OF THE INVENTION

By means of the instant invention there has been provided a plastic pipe having an integral end connection which may be joined with a like plastic pipe or a semi-rigid pipe having a mating integral end connection. The adjacent pipes may be pushed together to mate the end connectors in a locking engagement to resist any tendency to separate the joined pipe ends.

The plastic pipe employed is desirably of a polyolefin nature such as polyethylene, polypropylene or polybutylene having semi-rigid characteristics but also having the ability to flex or bend and expand and compress to a slight degree to accommodate the interfit of the male and female end connections of the pipe when press-fitted together. It will be understood that other plastic pipes having similar characteristics may also be used. The integral end connections may be formed in the pipe when fabricated in the molding process or later such as by machining or the like.

The structure of the end connection is in the nature of one or more axially extending wedge shaped internal ribs and grooves formed on the interior of the female member which interfit in locking relation with one or more wedge shaped exterior ribs and grooves formed on the exterior of the male member. When the male member is forceably pushed into the female member the latter is slightly expanded or distended while the male end may be slightly compressed until the two members are mated together at which time the female member contracts to its normal state and the male member expands to its normal state to lock the two members together and, through a wedge shaped interfit of the ribs and grooves, resist separation forces.

The wedge shaped ribs and grooves may be in the form of slanted or indented sides of the ribs and grooves which underlie one another in an axially extending direction and resist any tendency to pull apart when the ends are connected together. The wedge shaped configuration may be on the sides of the ribs and grooves which are engaged in the press-fit operation as well as the opposite sides to provide the locking engagement. The wedge shaped configuration may be conveniently provided by a dove-tailed trapezoidal shape or in the form of a mating bead and groove interfit for the ribs and the grooves.

When a dove-tailed trapezoidal shape or the like is employed where a pointed edge of a rib engages a groove corner in the pressfitting engagement, or where substantial forces of compression or tension are otherwise encountered, the corners of the ribs and grooves may be substantially rounded. This provides for stress distribution and spreading of the force and pressure to minimize any tendency to break or tear a rib in the pressfitting operation or forces encountered in service which might tend to separate the pipe.

The end ribs of both male and female members are slightly bevelled or chamfered to facilitate the sliding of the male member. To further ease this movement where a series of ribs are employed, the end or outer ribs of both the male and female members are wider than the corresponding end or outer grooves to prevent premature locking of the ribs and grooves before the members are fully engaged. This relationship enables the end of the male member to ride past the end of the female member until it approaches a shoulder stop of the female member to provide proper registration of the ribs and grooves for the final locking engagement.

The above features are objects of this invention. Further objects will appear in the detailed description which follows and will be otherwise apparent to those skilled in the art.

For purpose of illustration of this invention a preferred embodiment and modifications thereof are shown and described hereinbelow in the accompanying drawing. It is to be understood that this is for the purpose of example only and that the invention is not limited thereto.

IN THE DRAWINGS

DESCRIPTION OF THE INVENTION

Figure 1:
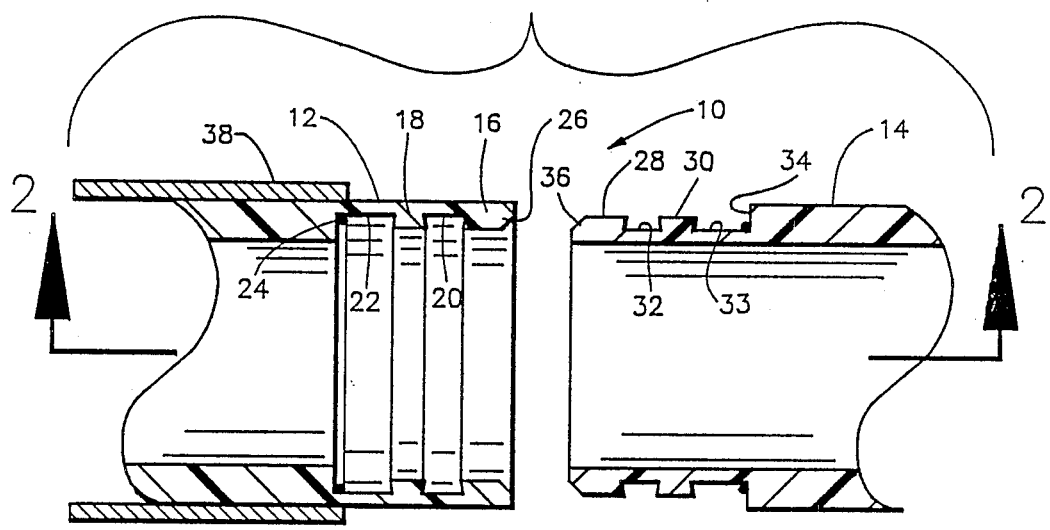
FIG. 1 is a view in axial section of the pipe having the integral end lock connections before being joined.

The plastic pipe having the integral end connections is generally illustrated by the reference numeral 10 in FIGS. 1-3 and 7. Each length of pipe is provided with a female connection 12 and a male connection 14, although it will be understood that where desired alternate pipes may have both ends with male and female connections and that the pipes may be fitted together in this fashion.

The plastic pipe is preferably polyethylene but other polyolefin pipes, such as polypropylene and polybutylene, having similar characteristics of being semi-rigid, the ability to bend slightly along substantial lengths and having the capacity to distend or contract slightly may be employed. The pipes may range in diameter from about three inches to over five feet and have a substantial wall thickness to withstand internal and external pressures and resistance to abrasion when the pipes are moved along the ground in various types of construction.

The integral female and male end connectors are formed on the interior and exterior surface in the fabrication of the pipe itself as in the molding process or by machining. Each of the end connections has one or more ribs and grooves which interfit with one another when the female and male end connections are press-fitted together as will be more fully described hereinbelow. When fitted and locked together the joined pipes present a flush continuous internal and external surface which reduces internal friction or resistance to fluid flow on the interior and provides a smooth external surface presenting no impediment or drag when moved along the ground or through a pipe as in a slip-lining operation.

Figure 2:
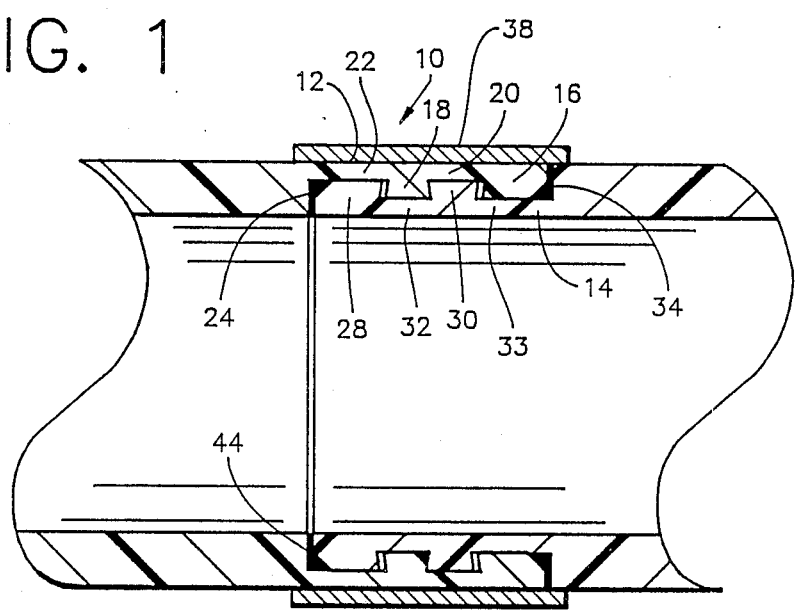
FIG. 2 is an enlarged view in axial section showing the joined ends of the pipe.
Figure 3:
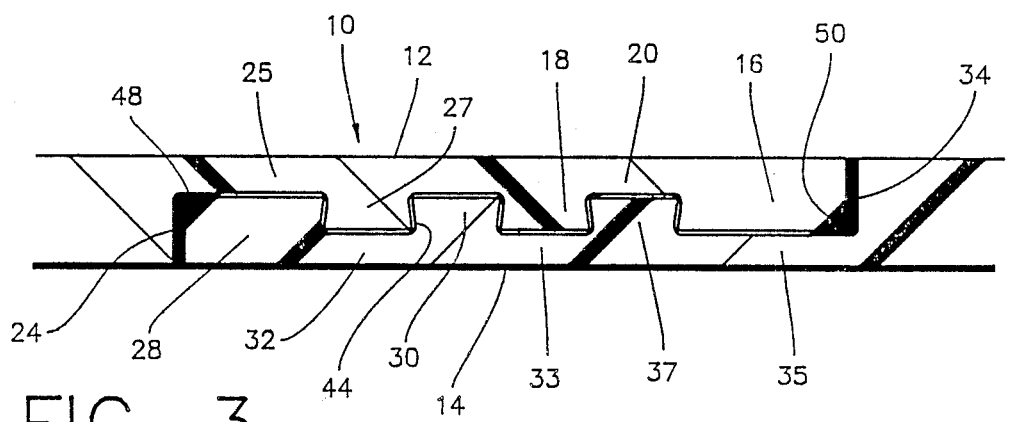
FIG. 3 is a further enlarged fragmentary view in axial section similar to FIG. 2 showing the interlocking connection and having an additional rib and groove series.

The female end connector 12 is comprised of an end or outer dove-tailed axially extending wedge shaped rib 16 and an inner similar wedge shaped rib 18. A first or outer wedge shaped groove 20 separates the two ribs while a second or interior wedge shaped groove 22 separates the inner rib 18 from a stop shoulder 24 as best shown in FIG. 2. The sides of the wedge shaped grooves slant from the perpendicular with the angle of the slant being, for example, 8° but it will be understood that the degree of the slant may be varied as desired. FIG. 3 shows a groove 25 separating a second inner rib 27 from the stop shoulder 24. In order to facilitate the joining or riding together of the female and male end connections, the end rib 16 has a bevelled or chamfered surface 26 formed at the outer corner of the rib.

The male end connection 14 has ribs and grooves formed in a similar fashion to that of the female end connection 12 but on the exterior of the pipe. Thus, the male end has an end or outer wedge shaped rib 28 formed on the pipe along with a second or inner wedge shaped rib 30. A first or outer wedge shaped groove 32 separates the two ribs while a second or inner wedge shaped groove 33 separates the inner rib 30 from a stop shoulder 34. FIG. 3 shows a groove 35 separating a second inner rib 37 from the stop shoulder 34. A bevelled or chamfered surface 36 is formed at the outer corner of the male end connection which facilitates the joining together of the end connections and distends or expands the female end connection and compresses the male connection by the wedging or camming action when the bevelled surfaces 26 and 36 of the female and male end connections are pressed together.

In order to ensure that the ribs and grooves of the female and male end connections do not prematurely engage until the full joined connection is made, as shown in FIG. 2, the end or outer ribs 16 and 28 of the female and male end connections, respectively, are constructed to be wider than the end grooves 20 and 32 of the female and male end connections, respectively. This prevents engagement of the ribs in these grooves. Proper engagement of the aforementioned end ribs 16 and 28 occurs when the female and male end connections are completely pushed together at which time engagement of the aforementioned ribs 16 and 28 occurs in the grooves 33 and 22, respectively, as will be seen in FIG. 2. FIG. 3 shows the engagement of ribs 16 and 28 with grooves 35 and 25, respectively. Similar engagement of the inner ribs 18 and 30 of the female and male end connections, of somewhat lesser width than the end ribs, will take place in the outer grooves 32 and 20 of the male and female end connections, respectively. It will be understood that a slight tolerance is provided for the interfit of the ribs in the mated relation in the grooves as will be well understood in the art.

Where desired the tolerance may be eliminated and the ribs may be made slightly wider at the outside or end than the mouth of the grooves with the registering exterior corners of the ribs or grooves, or both, being chamfered, bevelled or rounded. By this relationship a camming action may be effected to force the slightly wider ribs into the grooves by taking advantage of the slight resiliency of the polyolefin pipe. This relationship also augments the wedging interlock of the ribs in the grooves.

A locking relationship for the ribs and grooves when the male and female end connections are joined is provided for the ribs and the mating grooves through the wedge shaped configuration and the opposed slanting sides of the ribs. As best shown in FIGS. 2 and 3 the wedge shape is in the form of a trapezoid but it will be understood that outer wedge shaped forms may be utilized in order to provide a locking engagement. In the trapezoidal form the slanting sides of the ribs and grooves which bear and mate against one another, as shown in FIGS. 2 and 3, provide resistance to forces such as by compression or tension tending to separate the rib and groove engagement.

Figure 6:
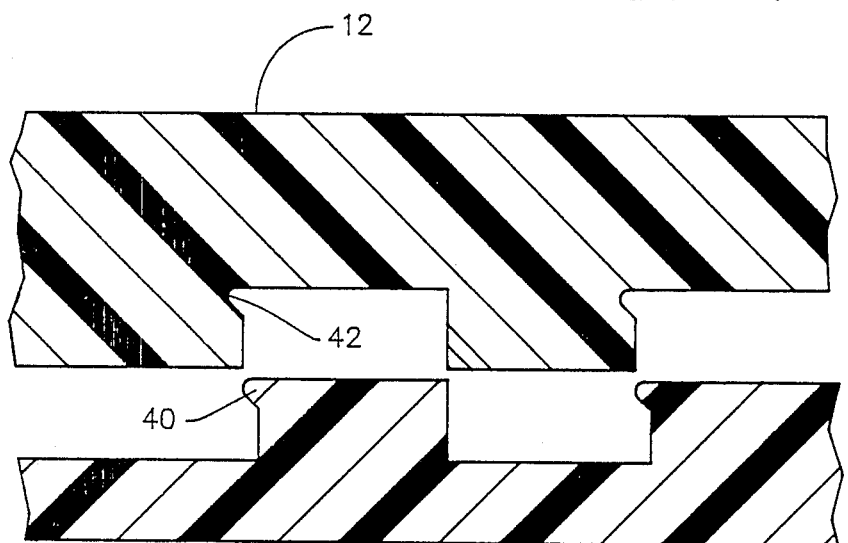
FIG. 6 is an enlarged exploded view in axial section showing a superimposed connection with a further modified rib and groove construction.

In order to reinforce the joined end connections when coupled together, a reinforcing sleeve 38 as shown in FIGS. 1, 2 and 6 may be employed. The sleeve may for great strength be of steel but it will be understood that other materials such as polyethylene or the like may be employed. The sleeve may be employed to improve the strength of the coupled end connections to withstand internal pressures up to the design rating of the remainder of the pipe. As shown in FIGS. 1 and 6, the sleeve may be fitted snugly by a slidable friction fit on the female end of the pipe 12, or on the male end 14 as desired, slightly away from the end connection structure and, after coupling, moved axially to cover the coupled end connections.

A modified axially extending wedge shaped rib and groove construction is shown in FIG. 6 in which the wedge shape portion has a greater width than the remainder of the respective rib and groove to provide what may be termed a modified dove-tail wedge. In this form the wedge shaped ribs are formed by a bead 40 at an exterior corner of the ribs which is adapted to engage a slot or groove 42 at an interior corner of a mating groove within the rib. This relationship when the male and female ends are connected provides a wedging and locking engagement. An additional feature of the bead and groove engagement is provided by the rounded interfit which effectively distributes stress at the interfitting corners to distribute or diffuse force concentration in the region due to press-fitting which might tend to break or tear the ribs. While the bead 40 is shown at a leading exterior corner of a rib of the male member 14 and a trailing interior corner of a groove of the female member where the stress occurs, it will be understood that this relationship may be reversed and that the bead may be on a leading exterior corner of a rib of the female member and that the groove may be at a trailing interior corner of a groove of the male member. Both types of relationships may also be utilized.

Figure 5:
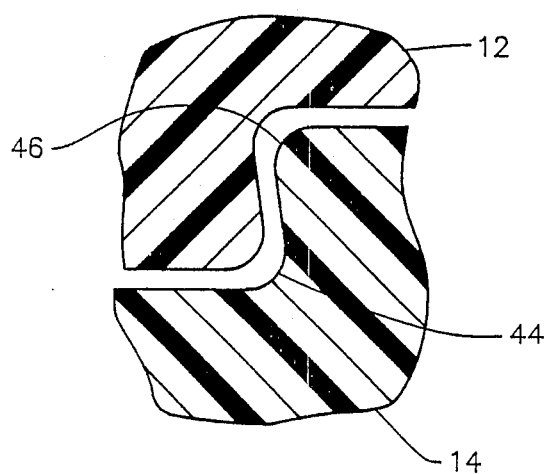
FIG. 5 is a view similar to FIG. 4 showing a modified rib and groove corner construction.
Figure 4:
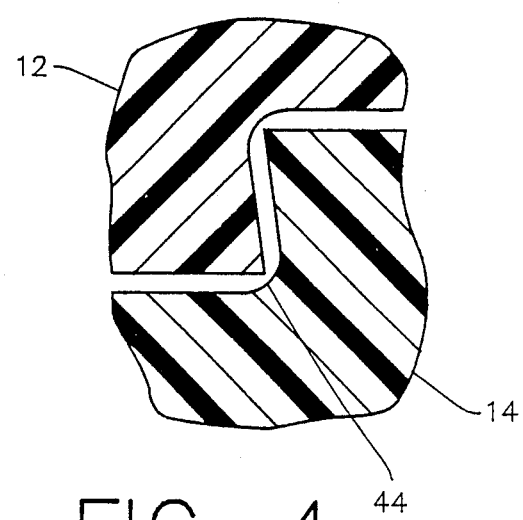
FIG. 4 is an enlarged view in axial section showing the rib engagement with a rounded groove corner.

The trapezoidal dove-tail shaped ribs and grooves may also be provided with a feature to distribute stress or the interfitting corners of the ribs and grooves when press-fitted together or to withstand compression or tension forces encountered during service. It should be understood that when pressure or tension is placed on the joined male and female end connections the exterior corners of the trapezoidal wedge shaped ribs may exert great force on the interfitting interior corners of the mating grooves. In order to diffuse or distribute the force and prevent a point-like concentration the interior corners of the grooves are provided with a rounded shape 44 as shown in FIGS. 3 and 4. In order to maximize the force distribution the exterior corners of the ribs may likewise be rounded at 46 as shown in FIG. 5.

Where the forces encountered are compression forces such as from the press-fitting of the male and female end connections the rounded interior corners at the trailing interior corners of the grooves and the leading exterior corners of the ribs need only be rounded. Where opposite or separation forces may be encountered, such as by tension in pulling a string of connected pipe lengths along the ground, the trailing exterior corners of the ribs and the leading interior corners of the grooves may be rounded, and it will be understood that one or both the force conditions may be accommodated as desired by rounding all the exterior corners of the ribs and all the interior corners of the grooves.

As an actual example, the female and male end connections may be formed in length of 20 to 40 feet of polyethylene pipe having an outside diameter of 6.63 inches and an internal diameter of 6.19 inches and a modules of elasticity of 100,000 psi to 140,000 psi at room temperature. In the press-fitting together of the female and male end connections an axial force or 900 pounds to 1,100 pounds may be applied. Deformation or distending of the female end connector and compression of the male end to accommodate the interfit of the male member as the respective ribs slide over one another until registering engagement is effected is about 2%, well under an upper limit of about 5%, which can be safely encountered before a permanent distortion.

When the pipe is to be joined together, a gasket compound or sealant such as that shown at 48 and 50 in FIG. 3 may be employed. This may be in the form of any conventional sealant such as a flexible butyl rubber sealant or the like. The sealant may also be used between the ribs and grooves to fill the spaces therein to enhance the wedging and locking action.

USE

The pipe of this invention with the integral end connections is simply and easily connected together to provide a stable and reliable locking engagement. This is of particular advantage in the field where labor and equipment may be difficultly accessible.

Figure 7:
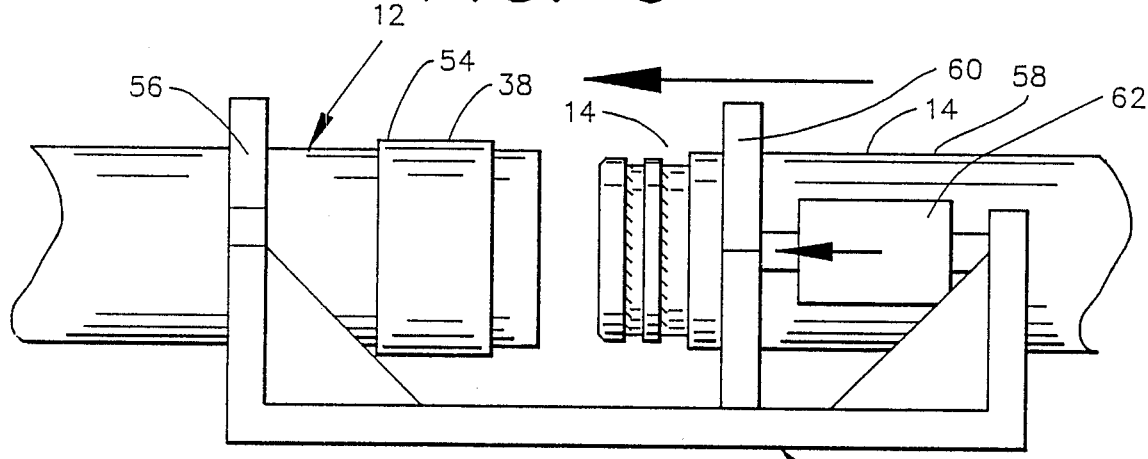
FIG. 7 is a schematic view on a reduced scale showing a clamp and ram for forcing ends of the pipe together.

One method of joining the separate lengths together comprises a clamp and press device, generally indicated by the reference numeral 52 in FIG. 7 may be employed. One pipe length 54 having a female end connection 12 integrated therein may be clamped by the clamp 56 while another pipe length 58 having a male end connection 14 is clamped in a moveable press clamp 56 powered by a hydraulic piston 62 or the like moveable in the direction of the arrow. The pipe length 58 is moved toward the pipe length 54 to insert the male end connection into the female end connection until the complete locking interfit shown in FIGS. 2 and 3 is obtained. A reverse arrangement of the pipe lengths in the clamped press device may be employed as will be readily understood.

Other means for joining may be employed which, per se, form no part of this invention. In the field, hand winches or come-a-longs, heavy construction equipment such as bulldozers, back hoes and the like may be used to push one length of pipe into another pipe which may be anchored or fixed against movement in one fashion or another.

The pipe lengths may be joined in a string of pipe lengths and pulled or pushed to any desired final location. The locked joint when sealed with the flexible butyl rubber sealant assures a water tight joint preventing both infiltration and exfiltration. This is particularly beneficial where the corrosion, abrasion resistance and the flexibility of polyolefin pipe is needed.

The outside and inside surfaces are flush and of constant diameter which enhances fluid flow and obviates external fittings and protruberances which would cause problems in pulling the pipe along the ground or in the interior of a larger pipe to be repaired as in the case of slip-lining. Further, no reduction in pipe size is required as where external clamps are employed.

When joined, the locking interfit provided by the wedge shaped ribs and interfitting grooves resist any tendency for separation between the joined connections. The rounded corners of the grooves and ribs further provide the effective stress distribution to avoid rib damage or breakage in the press-fitting joining operation or forces encountered in service after the pipe ends have been connected. Where greater strength is required to withstand high internal pressures, the reinforcing sleeve 38 may be simply employed by sliding it axially over the coupling.

While the end connections have been disclosed for both the female and male end connections as being formed integrally in plastic pipe for use with each other, it will be understood that in some cases there may be a connection to a rigid steel pipe or the like, equipped with mating ribs and grooves, as at the terminal or start of a line or the like.

Various changes and modifications may be made within this invention as will be apparent to those skilled in the art. Such changes and modifications are within the scope and teaching of this invention as defined in the claims appended hereto.

What is claimed is:

1. Plastic pipe having an integral end connection comprising a pair of female and male integral end connections for adjacent lengths of pipe adapted to be press-fitted together to form a locked end connection with said adjacent lengths of pipe, said female end connection comprising a plurality of discrete interior circumferentially extending radial, circular, uniform diameter ribs and plurality of discrete interior circumferentially extending radial, circular, uniform diameter grooves bordering said ribs, said male end connection comprising a plurality of corresponding discrete exterior circumferentially extending radial, circular, uniform diameter ribs and a plurality of discrete exterior circumferentially extending radial, circular uniform diameter grooves bordering said last named ribs, said male and female end connections being adapted to be axially press-fitted together to distend said female end connection and compress said male end connection until a mating relation of the ribs and grooves in said end connections is obtained, said ribs and said grooves having an axially extending wedge shape portion having a greater axial width than the remainder of the respective ribs and grooves from which they extend, said wedge shape portion extending exteriorly in an axial direction from a side of the ribs and interiorly in an axial direction from a side of the grooves to provide a locking fit to resist separation.

2. The plastic pipe of claim 1 in which the ribs and grooves have an inverted trapezoidal dove-tail shape.

3. The plastic pipe of claim 1 in which leading edges of the ribs and trailing edges of the grooves in at least one of the female and male end connections are provided with a mating axially extending wedge shaped configuration.

4. The plastic pipe of claim 3 in which said wedge shaped configuration is provided by a protruding bead on a side of the ribs in at least one of the female and male end connections engageable with a bead interfitting groove in a side of said first named grooves in at least one of the female and male end connections.

5. The plastic pipe of claim 1 in which said grooves of the female member have substantially rounded interior corners at trailing sides of said grooves engageable with an exterior corner of said wedge shaped ribs when said pipe is press-fitted together to distribute stress.

6. The plastic pipe of claim 5 in which said wedge shaped ribs of the male member have substantially rounded exterior corners at leading sides of said wedges engageable with the rounded corners of the grooves of the female member to distribute stress in the corners of the ribs and the grooves when said pipe is press-fitted together.

7. The plastic pipe of claim 6 in which said ribs of the female member have substantially rounded exterior corners at leading sides of said ribs, and said grooves in the male member have rounded interior corners at trailing sides of said last named grooves to provide stress distribution for engagement of all corners of the aforementioned ribs and grooves for both the male and female members under both compression and tension forces.

8. The plastic pipe of claim 1 in which at least one pair of mating ribs and grooves in the male and female end connections have grooves with substantially rounded interior corners at leading and trailing sides of said grooves to distribute stress when the end connections are engaged and subjected to compression and tension forces.

9. The plastic pipe of claim 1 in which at least one pair of mating ribs and grooves in the male and female end connections have ribs with rounded exterior corners on leading and trailing sides of said ribs and have grooves with substantially rounded interior corners at leading and trailing sides of said grooves to distribute stress when the end connections are engaged and subjected to compression and tension forces.

10. The plastic pipe of claim 1 in which a reinforcing sleeve is slidably fitted by a friction fit upon one of the pipe ends to be joined apart from the end connection and is moveable into registry with the locked end connections after the end connections are locked together.

11. The plastic pipe of claim 1 in which outside portions of the wedge shaped ribs are slightly wider than outside openings of said wedge shaped grooves, said ribs are moveable into registering grooves when locking engagement is effected by the compression of the male end connection and the distention of the female end connection when said end connections are press fitted together in locking engagement.

12. The plastic pipe of claim 11 in which exterior corners of said wedge shaped ribs and exterior corners of said wedge shaped grooves are bevelled to provide a camming action to facilitate the engagement of said ribs and grooves.

13. Plastic pipe having an integral end connection comprising a pair of female and male integral end connections for adjacent lengths of pipe adapted to be press-fitted together to form a locked end connection having a flush exterior and interior surface with said adjacent lengths of pipe, said female end connection comprising a plurality of discrete interior circumferentially extending radial, circular, uniform diameter ribs and a plurality of discrete interior circumferentially extending radial, circular, uniform diameter grooves bordering said ribs, said male end connection comprising a plurality of corresponding discrete exterior circumferentially extending radial, circular, uniform diameter ribs and a plurality of discrete exterior circumferentially extending radial, circular, uniform diameter grooves bordering said last named ribs, said male and female end connections being adapted to be axially press-fitted together to distend said female end connection and compress said male end connection until a mating relation of the ribs and grooves in said end connections is obtained, said ribs decreasing in width inwardly from an end of each of said pipes to mate with a plurality of grooves correspondingly increasing in width inwardly from said ends of said pipes to provide for proper registry to prevent premature rib and groove engagement until a locking registration is obtained, said ribs and said grooves having an axially extending wedge shape portion having a greater axial width than the remainder of the respective ribs and grooves from which they extend, said wedge shape portion extending exteriorly in an axial direction from a side of the ribs and interiorly in an axial direction from a side of the grooves to provide a locking fit to resist separation.

14. The plastic pipe of claim 13 in which the ribs and grooves have an inverted trapezoidal dove-tail shape.

15. The plastic pipe of claim 13 in which leading edges of the ribs and trailing edges of the grooves in at least one of the female and male end connections are provided with a mating axially extending wedge shaped configuration.

16. The plastic pipe of claim 13 in which said wedge shaped configuration is provided by a protruding bead on a side of the ribs in at least one of the female and male end connections engageable with a bead interfitting groove in a side of said first named grooves in at least one of the female and male end connections.

17. The plastic pipe of claim 13 in which said grooves of the female member have substantially rounded interior corners at trailer sides of said grooves engageable with an exterior corner of said wedge shaped ribs when said pipe is press-fitted together to distribute stress.

18. The plastic pipe of claim 13 in which said wedge shaped ribs of the male member have substantially rounded exterior corners at leading sides of said wedges engageable with the rounded corners of the grooves of the female member to distribute stress in the corners of the ribs and the grooves when said pipe is press-fitted together.

19. The plastic pipe of claim 13 in which said ribs of the female member have substantially rounded exterior corners at leading sides of said ribs, and said grooves in the male member have rounded interior corners at trailing sides of said last named grooves to provide stress distribution for engagement of all corners of the aforementioned ribs and grooves for both the male and female members under both compression and tension forces.

20. The plastic pipe of claim 13 in which at least one pair of mating ribs and grooves in the male and female end connections have grooves with substantially rounded interior corners at leading and trailing sides of said grooves to distribute stress when the end connections are engaged and subjected to compression and tension forces.

21. The plastic pipe of claim 13 in which at least one pair of mating ribs and grooves in the male and female end connections have ribs with rounded exterior corners on leading and trailing sides of said ribs and have grooves with substantially rounded interior corners at leading and trailing sides of said grooves to distribute stress when the end connections are engaged and subjected to compression and tension forces.

22. The plastic pipe of claim 13 in which a reinforcing sleeve is slidably fitted by a friction fit upon one of the pipe ends to be joined apart from the end connection and is moveable into registry with the locked end connections after the end connections are locked together.

23. The plastic pipe of claim 13 in which outside portions of the wedge shaped ribs are slightly wider than outside openings of said wedge shaped grooves, said ribs are moveable into registering grooves when locking engagement is effected by the compression of the male end connection and the distention of the female end connection when said end connections are press fitted together in locking engagement.

24. The plastic pipe of claim 23 in which exterior corners of said wedge shaped ribs and exterior corners of said wedge shaped grooves are bevelled to provide a camming action to facilitate the engagement of said ribs and grooves.

* * * * *